United States Patent [19]

Dorrfub et al.

[11] 4,421,431

[45] Dec. 20, 1983

[54] METHOD FOR DOT MATRIX PRINTING AT SELECTED UNIFORM DOT COLUMN SPACING

[75] Inventors: Klaus Dorrfub, Furth; Werner Krausser, Nuremberg, both of Fed. Rep. of Germany

[73] Assignee: Triumph-Adler A.G. fur Buro- und Informationstechnik, Nuremberg, Fed. Rep. of Germany

[21] Appl. No.: 472,204

[22] Filed: Mar. 4, 1983

Related U.S. Application Data

[63] Continuation of Ser. No. 254,123, Apr. 14, 1981, abandoned.

[30] Foreign Application Priority Data

Apr. 15, 1980 [DE] Fed. Rep. of Germany ....... 3014338

[51] Int. Cl.$^3$ .............................................. B41J 3/12
[52] U.S. Cl. ................................... 400/124; 400/303
[58] Field of Search ....................... 400/121, 124, 303; 101/93.04, 93.05

[56] References Cited

U.S. PATENT DOCUMENTS 4,116,567  9/1978  San Pietro ........................... 400/124
4,119,383  10/1978  Watanabe et al. .................. 400/124

*Primary Examiner*—Paul T. Sewell
*Attorney, Agent, or Firm*—Joseph R. Spalla

[57] ABSTRACT

For use with a matrix printer, a method for printing dot columns at uniform spacing regardless of irregular print carrier motion, the column spacing selected, and the use of a low resolution pulse source. The pulse source generates control pulses at intervals representing carrier movement through a given distance greater than any selected dot column spacing. As disclosed the method calculates the distances from a control pulse to the possible printing positions between two control pulses, according to the column spacing selected, and the known distance between pulses. Also, the time between control pulses is measured and used with the known distance between pulses to calculate the carrier velocity. From the carrier velocity and the distance from a control pulse to printing positions between control pulses, the times of energization of the print wires to effect printing at the uniformly spaced printing positions are calculated.

When carrier motion is irregular as when starting up, the rate of change of velocity is employed to develop and apply a correction factor to influence and vary the times of energization of the print wires to achieve uniform dot column spacing.

2 Claims, 3 Drawing Figures

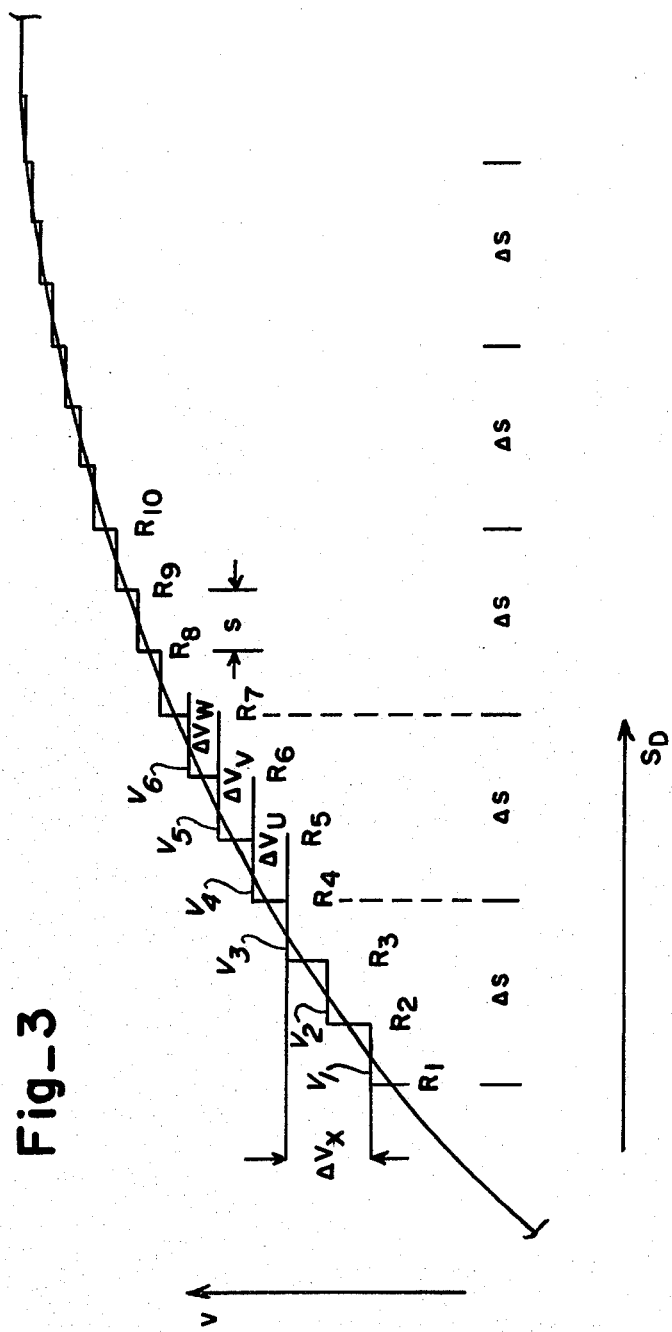

METHOD FOR DOT MATRIX PRINTING AT SELECTED UNIFORM DOT COLUMN SPACING

This application is a continuation, of application Ser. No. 254,123, filed Apr. 14, 1981, abandoned.

This invention relates to matrix printers; more particularly it relates to matrix printers in which characters are printed column serially by a columnar array of print wires mounted for movement with a carrier; and specifically to a method for printing dot columns at any selected uniform column spacing.

To print at uniformly spaced positions the prior art, e.g. U.S. Pat. Nos. 3,703,949, 3,905,463 and 4,024,941, among others, have employed high resolution devices in the form of discs or tapes with sensible marks or openings at the desired spacing to control the energization of print wires at the proper time to effect uniformly spaced printing regardless of irregularity in carrier motion. Such high resolution devices have been found to be relatively expensive to manufacture.

In accordance with the invention uniformly spaced printing at selected spacings, regardless of irregular print carrier motion, is achieved with a low resolution pulse source which generates control pulses at intervals corresponding to carrier movement through a given distance greater than the print spacing selected. The control pulses are utilized in conjunction with the known distance between pulses and the selected spacing between print columns to establish, relative to control pulses, all the printing positions, spaced selected distances apart, possible between two control pulses. Thus in each interval between control pulses printing positions are defined. In order that the print wires will be energized at the established print positions, the velocity of the carriage in a preceding interval between control pulses is calculated from the given distance between control pulses, and from the measured time between two preceding control pulses. The velocity so calculated and the distances from a control pulse to established print positions, are utilized to calculate times of energization.

An object of the invention is to provide a control for a matrix printer to enable dot columns to be printed at selected uniformly spaced distances notwithstanding irregular motion of a carrier supporting print elements.

Other objects, features and advantages of the present invention will become known to those skilled in the art from a reading of the following detailed description when taken in conjunction with the accompanying drawing wherein like reference numerals designate like or corresponding parts throughout the several views thereof, and wherein:

FIG. 3 is a curve showing carriage velocity against position.

Figure 1:
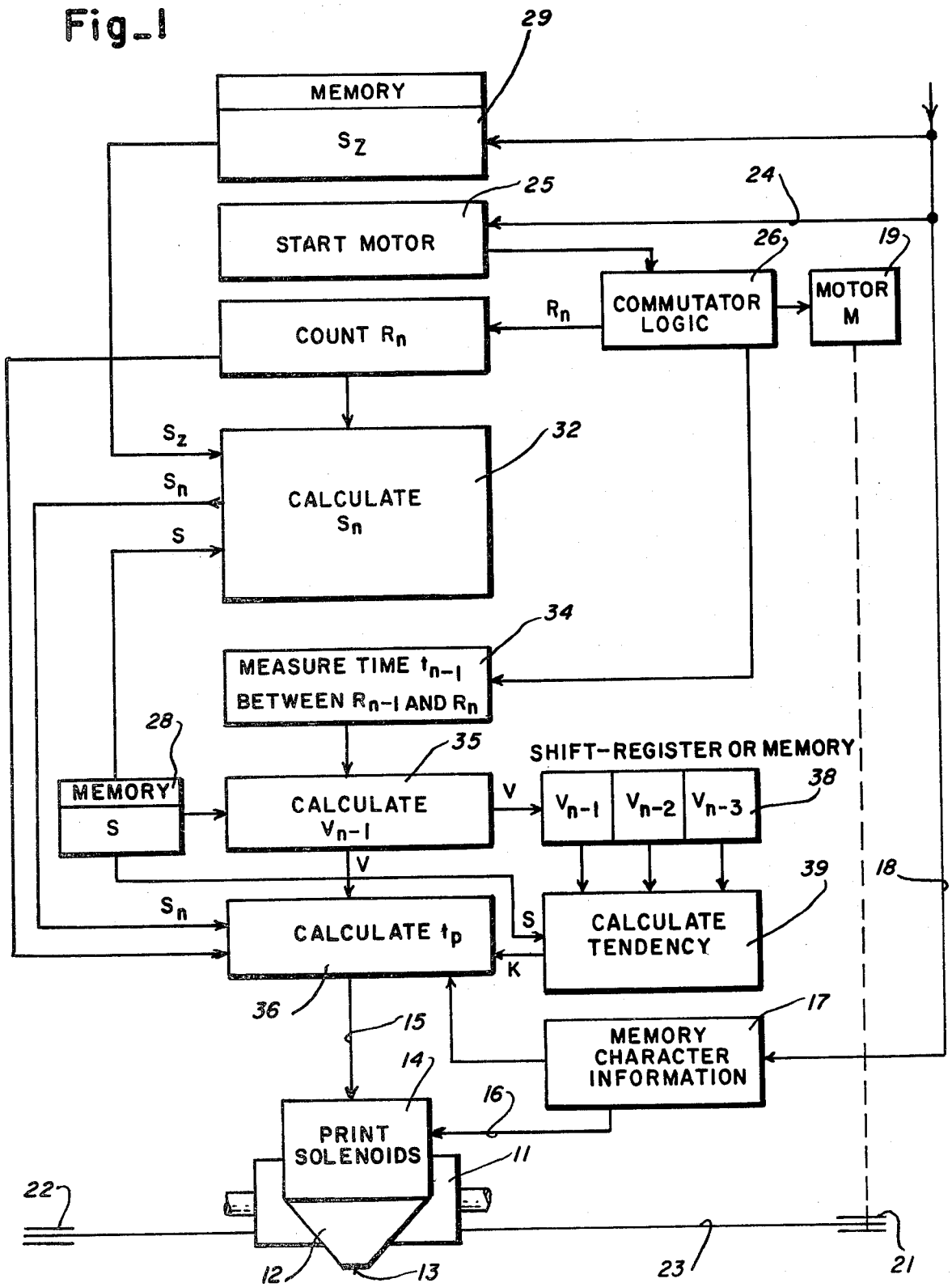
FIG. 1 is a block schematic diagram of elements of a control system in accordance with the invention.

Referring now to the drawing there is shown in FIG. 1 a system wherein only those logic elements of a microcomputer necessary to an understanding of the invention are depicted. The system includes a carriage 11 carrying a printer 12 comprising a column array of print wires 13 adapted to be driven to print by solenoids 14. As will be appreciated and explained further hereinafter, selectively conditioned print solenoids 14 will be energized by print signals on a line 15. Selected ones of the print solenoids 14 will be conditioned, column serially, over lines 16 from a memory 17 which receives character information of character width Z (FIG. 2) from data lines 18.

Figure 2:
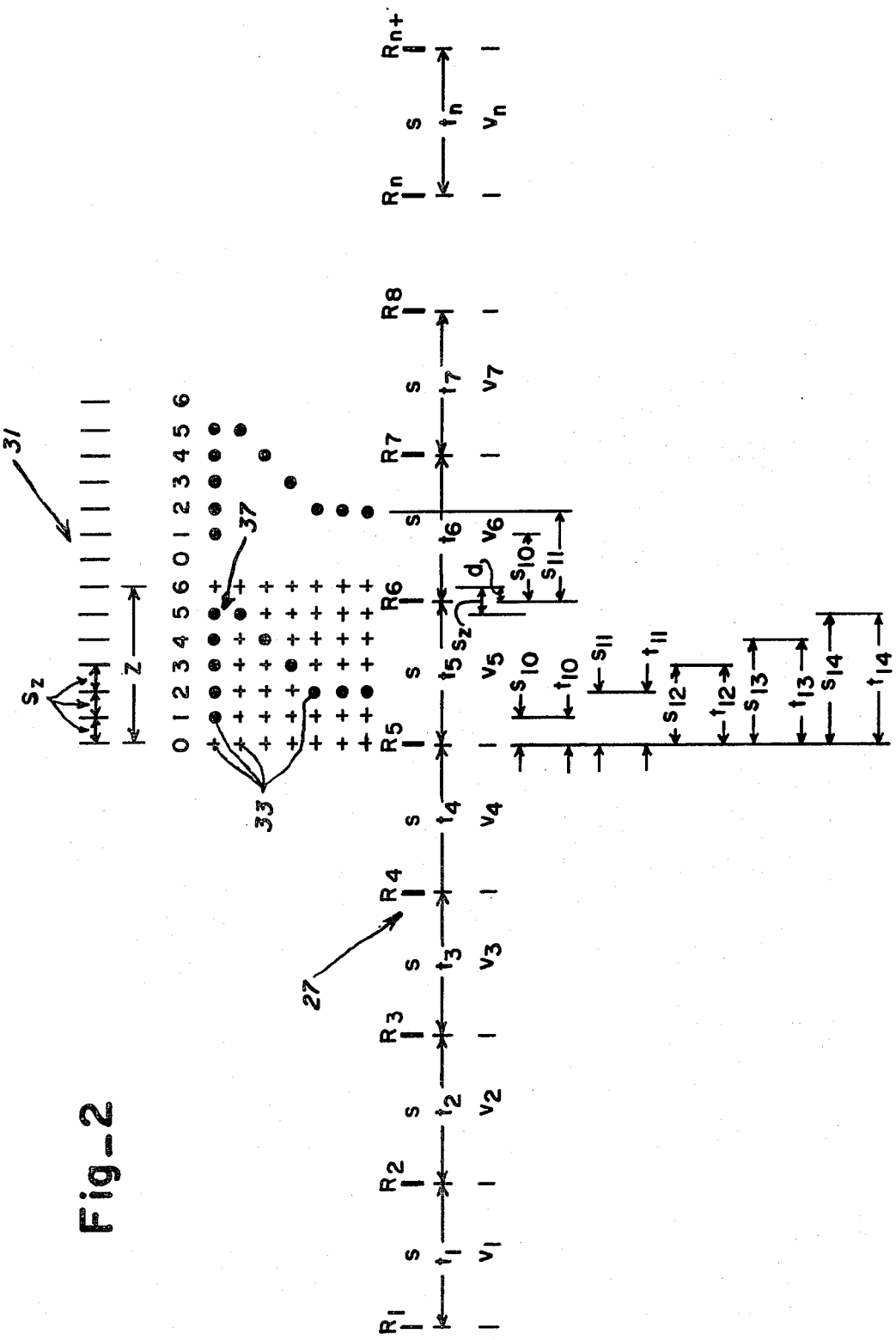
FIG. 2 is a diagram illustrating relationships between a low resolution electronically generated grid and an established high resolution printing grid with printing positions uniformly spaced.

A motor 19 is adapted when energized to drive a pulley 21. Trained around pulley 21 and a spaced pulley 22 is a cable 23 connected at opposite ends to the carriage 11 to effect movement of the carriage 11 across a printing line. The motor 19 will be energized to initiate the printing of a line of stored data applied to data lines 18 in response to a start pulse on line 24 to a motor start circuit 25. Motor 19 is preferably a brushless D.C. motor which is caused to be driven by output pulses from commutater logic or pulse generator circuitry 26. The output pulses from generator 26 serve also as control pulses $R_1$, $R_2$, $R_3$, etc. which, with reference to FIG. 2, issue at intervals $t_1$, $t_2$, $t_3$ corresponding to carriage movement through a given fixed distance S. As shown in FIG. 2 the motor is assumed to be up to speed and thus velocity changes from interval to interval are assumed to be negligible. Pulses $R_1$, $R_2$, $R_3$ etc. define a coarse printing grid generally designated by reference numeral 27.

As shown in FIG. 1 a memory 28 stores the fixed distance S between control pulses $R_1$ and a memory 29 stores the selected dot column spacing, $S_z$, i.e. the desired distance between print positions. With reference to FIG. 2, the selected spacings $S_z$ define a printing grid 31.

In a logic circuit 32 to which are applied pulses R, the known distance S between pulses R, and the selected distance $S_z$ between dot columns, as stored in memory locations 28 and 29, the printing grid 31 is established with reference to the coarse grid 27. As viewed in FIG. 2, distances $S_n$ i.e. $S_{10}$–$S_{14}$ measured from a pulse $R_n$ to all the possible printing positions 33 which can be accomodated between two pulses $R_n$ and $R_n+1$ are calculated.

Also in a logic circuit 34 the time $t_{n-1}$ between a pulse $R_n$ and its preceding pulse $R_{n-1}$ is measured and conveyed to a logic circuit 35 to which the known distance S in memory 29 is also supplied, whereby a calculation of the velocity of the carriage 11 in the previous interval is calculated. In a logic circuit 36, the established printing positions $S_n$ i.e. $S_{10-14}$ at the output of logic circuit 32, and the carriage velocity $V_{n-1}$ calculated in logic circuit 35 over the interval between pulses $R_{n-1}$ and $R_n$, are utilized to calculate the times $t_{10}$–$t_{14}$ for application on line 15 to energize the conditioned print solenoids to assure that printing of dot columns constituting a character 37 will occur at the established print positions 33 of printing grid 31.

It is to be noted that known distance S is not a multiple of the distance $S_z$ selected and in memory. Thus the logic circuit 32 is designed to be capable of keeping track of the distance between the last print position in a given interval between pulses, e.g. position 5 in interval $t_5$, and a following pulse R so that the first print position following a pulse R will always be spaced from the last print position in an earlier interval by the distance $S_z$. Thus with reference to FIG. 2 the print position 1 following pulse $R_6$ occurs at a distance $S_{10}$ from $R_6$ which is the sum of a remainder distance d and twice the distance $S_z$.

With reference to FIG. 3 there is shown a plot of carriage velocity v versus carriage travel $s_D$ divided into equal distances $\Delta S$ which contain an integral multiple of the distances S between two pulses R. As carriage velocity following motor energization, before it achieves constant velocity, increases at a particularly high rate, nonuniformly spaced printing columns would result. To avoid this the average speeds $V_1$, $V_2$, $V_3$ in a travel distance $\Delta S$ between pulses $R_1$ and $R_4$, as calculated in logic circuit 35; are conveyed to a shift register 38 and used in a further logic circuit 39, to which the known distance S is also applied, to carry out a tendency calculation to furnish a correction signal K for application to logic circuit 36 to vary the times of issuance of signals $t_{10}$–$t_{14}$ in the next $\Delta S$ interval between pulses $R_4$ and $R_7$ so that the velocity changes $\Delta V_u$, $\Delta V_n$, $\Delta V_w$ between pulses $R_4$, $R_5$–$R_5$, $R_6$–$R_6$, $R_7$ are appropriately equalized. Between pulses $R_4$ and $R_7$ a new tendency calculation will be carried out and utilized to correct printing times in the travel distance $\Delta S$ between pulse $R_7$ and $R_{10}$. Note is made that the changes $\Delta V$ shown are exaggerated and are in reality very small. As will be appreciated printing will be delayed until a tendency calculation, to correct times in the next distance $\Delta S$, is accomplished. It should also be understood that the above applies also to carriage decelleration.

The invention claimed is:

1. In a dot matrix printer having a column array of print wires mounted on a movable carriage, a method for printing dot columns at selectable uniformly spaced distances, comprising the steps of selecting a desired uniform dot column spacing,
    generating control pulses at intervals representing carriage movement through a known distance greater than the distance occupied by a plurality of printed dot columns at the selected uniform dot column spacing,
    determining the distances to all of the plurality of dot column printing positions possible at the selected uniform dot column spacing from a given control pulse to the next following control pulse,
    measuring the time between said given control pulse and its preceding control pulse,
    computing the velocity of said carriage from said known distance and measured time, and
    from said predetermined distances and computed velocities calculating the times for energizing said print wires to print dot column information at the desired uniform spacing in the interval following a given control pulse.

2. The method as recited in claim 1, further including the steps of averaging carriage velocity over a distance between a first sequence of at least three control pulses, and
    from said average carriage velocity and the distance between two control pulses calculating the velocity tendency to develop a correction factor for use in calculating the times for energizing said print wires as calculated in a second following sequence of at least three control pulses.

* * * * *

UNITED STATES PATENT AND TRADEMARK OFFICE
CERTIFICATE OF CORRECTION

PATENT NO. : 4,421,431
DATED : December 20, 1983
INVENTOR(S) : Klaus Dorrfub, et al It is certified that error appears in the above-identified patent and that said Letters Patent are hereby corrected as shown below:

IN THE TITLE PAGE Column 1,

"[22] Filed: Mar. 4, 1983" should read --- [22] Filed: Mar. 10, 1983 ---.

IN THE CLAIMS

Claim 1, line 19, "predetermined" should be determined.

Signed and Sealed this

First Day of May 1984

[SEAL]

Attest:

Attesting Officer

GERALD J. MOSSINGHOFF

Commissioner of Patents and Trademarks